(12) United States Patent
Tone et al.

(10) Patent No.: US 6,602,142 B2
(45) Date of Patent: Aug. 5, 2003

(54) CONSTANT VELOCITY UNIVERSAL JOINT

(75) Inventors: Hiroshi Tone, Iwata (JP); Tatsuhiro Goto, Iwata (JP); Hideki Kondo, Iwata (JP); Hisaaki Kura, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/933,875

(22) Filed: Aug. 22, 2001

(65) Prior Publication Data

US 2002/0055388 A1 May 9, 2002

(30) Foreign Application Priority Data

Sep. 6, 2000 (JP) ........................................ 2000-270369

(51) Int. Cl.⁷ ................................................ F16D 3/205
(52) U.S. Cl. ........................................ 464/111; 464/123
(58) Field of Search ................................ 464/111, 120, 464/121, 122, 123, 124, 905; 384/192, 193, 205

(56) References Cited

U.S. PATENT DOCUMENTS 4,810,232 A    3/1989  Farrell et al. ............... 464/111
5,538,473 A *  7/1996  Busch et al. ............. 464/123 X
5,989,124 A * 11/1999  Goto et al. .................. 464/111
6,467,669 B1 * 10/2002  Okada ..................... 384/192 X

FOREIGN PATENT DOCUMENTS

DE      44 08 812 A1   9/1994
EP       0 836 023 A1   4/1998
FR         269 89 28    6/1994
GB            3053    * 2/1916  ................ 384/192

* cited by examiner

*Primary Examiner*—Greg Binda
(74) *Attorney, Agent, or Firm*—Arent Fox Kintner Plotkin & Kahn, PLLC

(57) ABSTRACT

A constant velocity universal joint has a ring that is fitted on each trunnion and rotatably supports a corresponding roller so the roller is movable axially of an outer joint member along a roller guide surface. The outer circumferential surface of each trunnion has a straight shape, as viewed in the longitudinal section, and has, as viewed in the cross section, a shape which allows contact with the inner circumferential surface of the ring in a direction orthogonal to the axis of the outer joint member. A generatrix of the inner circumferential surface of the ring forms part of an ellipse having a major axis extending in a direction orthogonal to the axis of the ring or is composed of a central convex circular arc and a tangential line extending from an end portion of the circular arc to an end face of the ring.

12 Claims, 13 Drawing Sheets

FIG.1B
FIG.1C
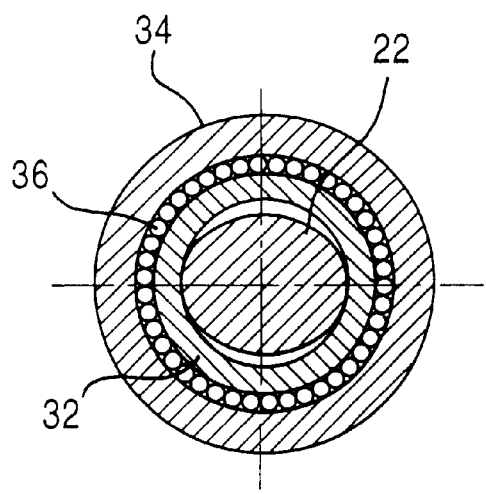
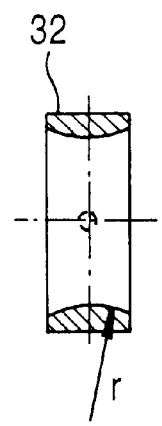
FIG.1A
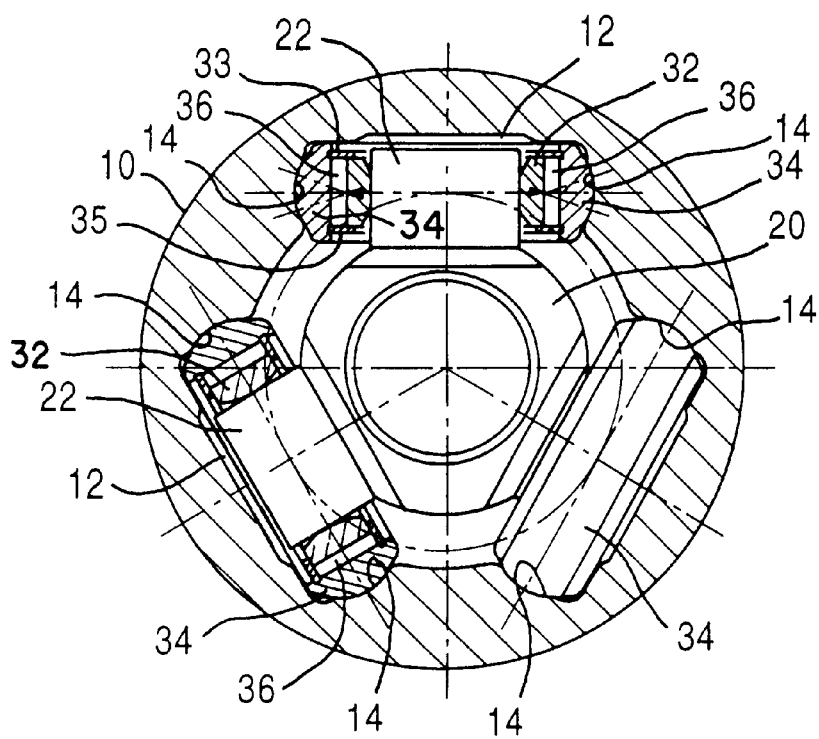

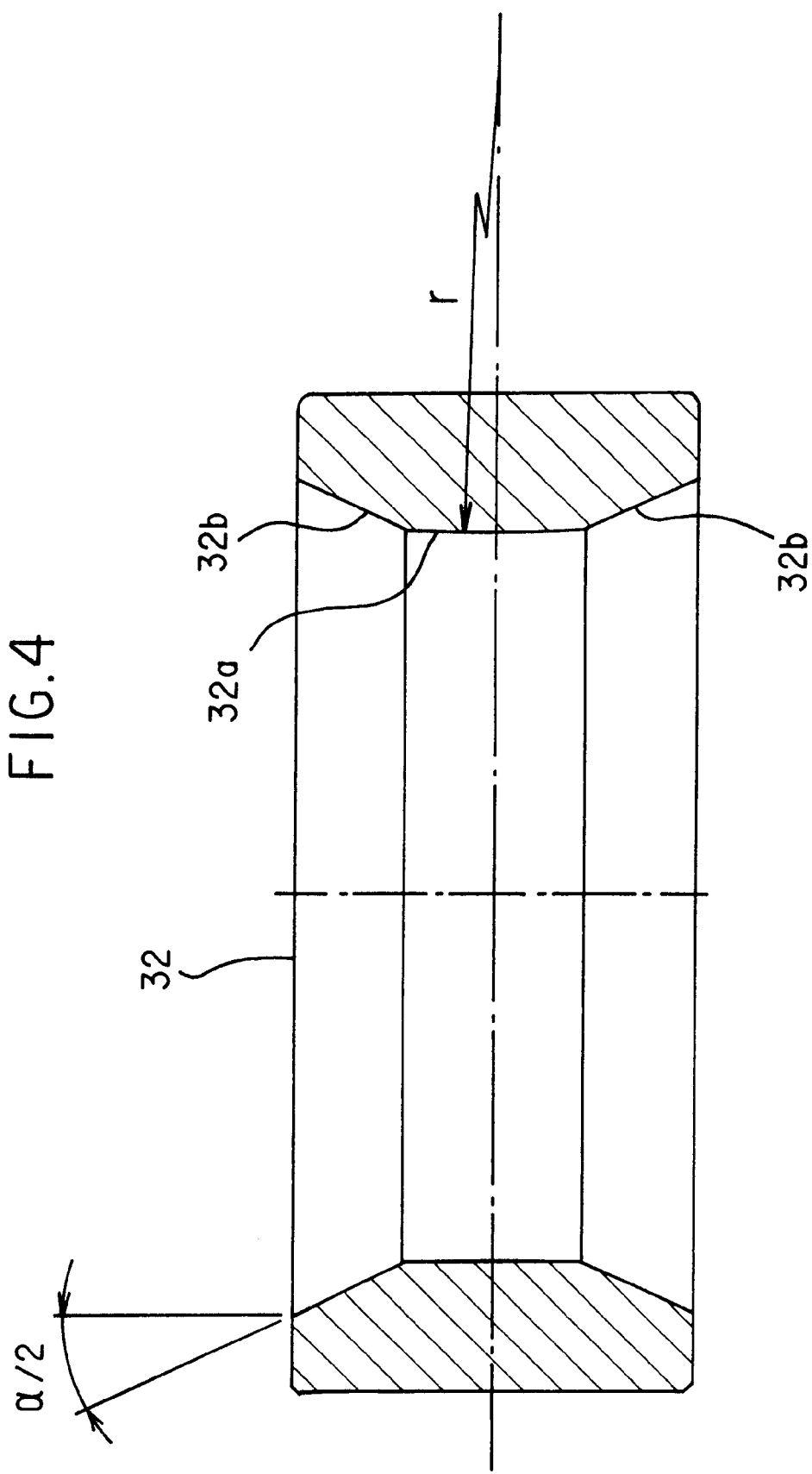

FIG.11A
RELATED ART
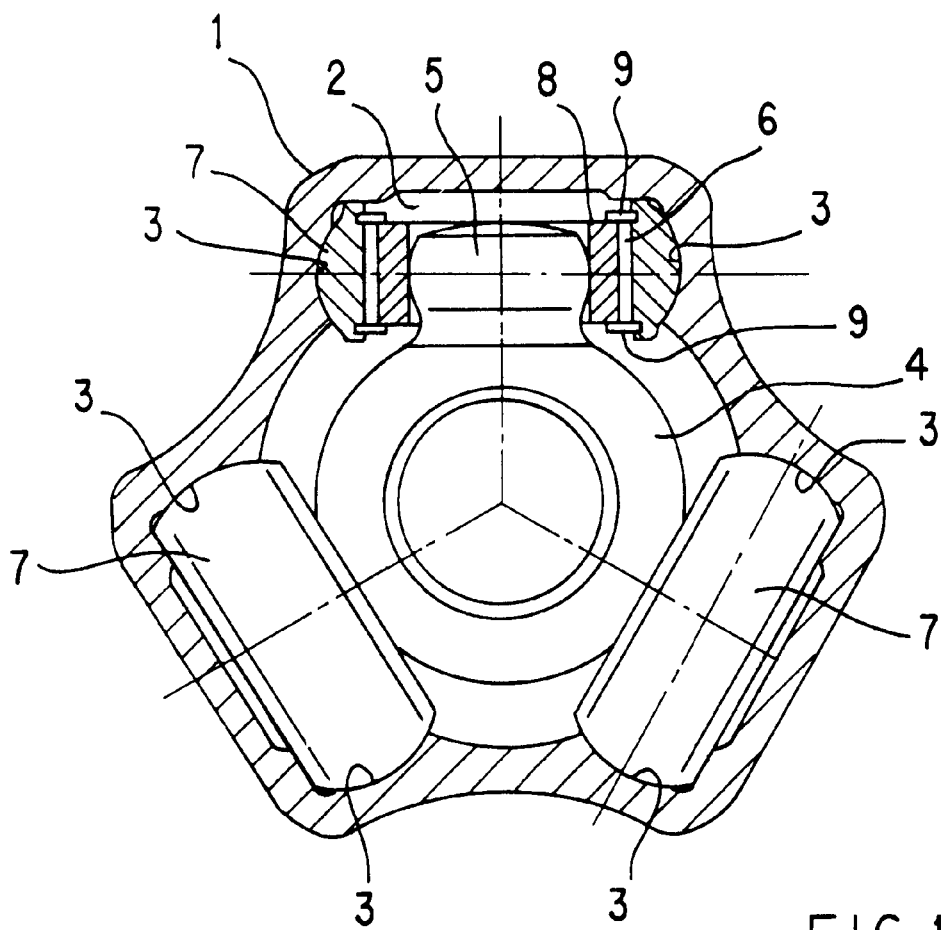
FIG.11B
RELATED ART
FIG.11C
RELATED ART
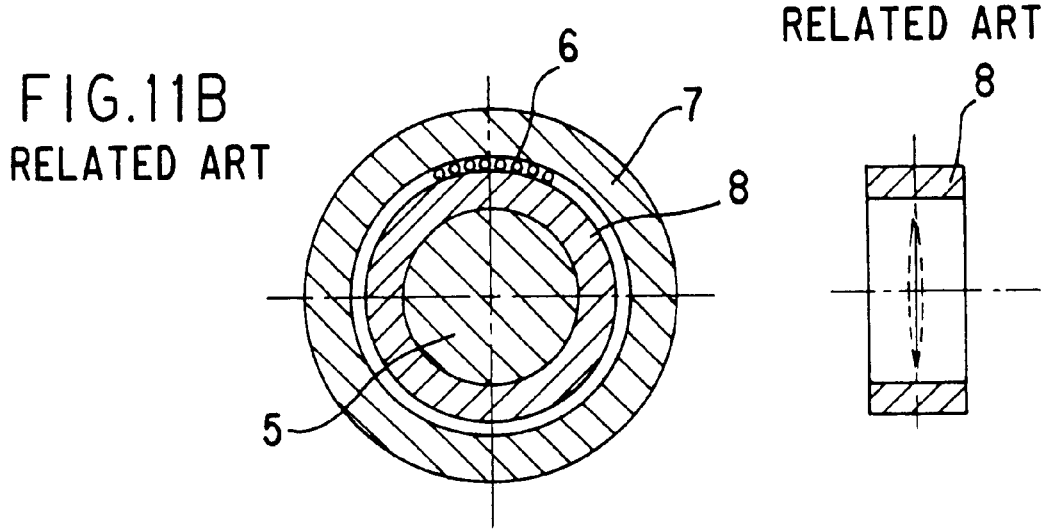

FIG.13A
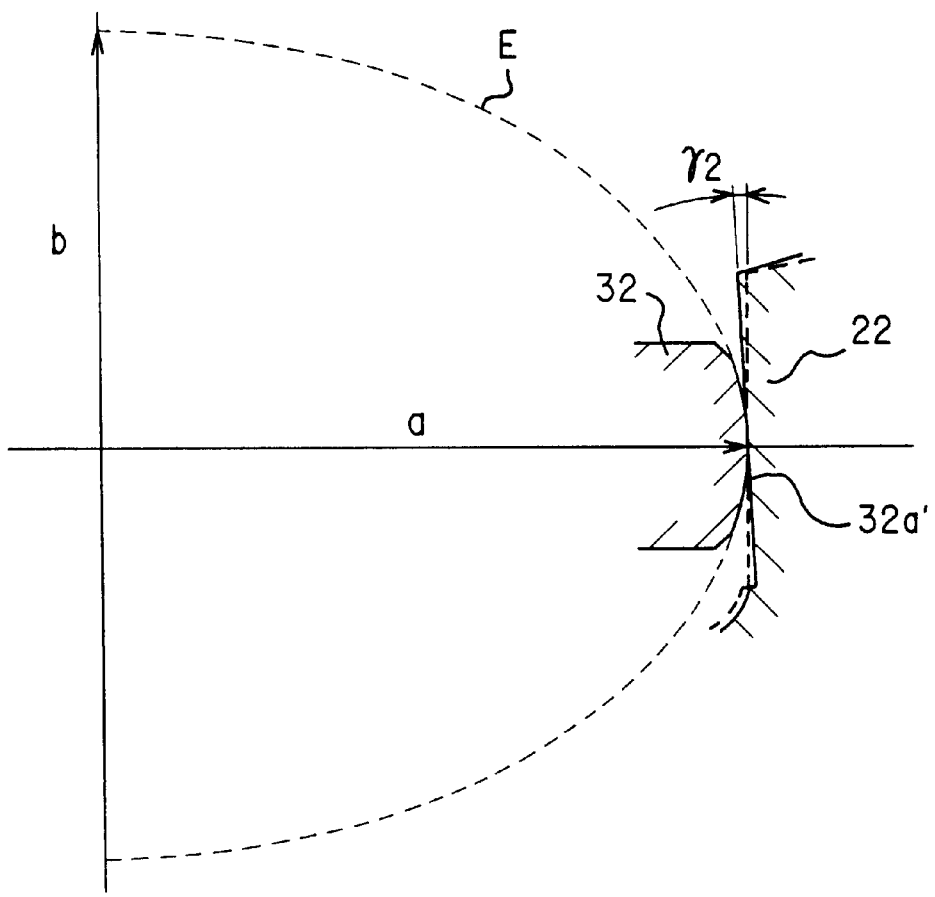
FIG.13B
FIG.13C
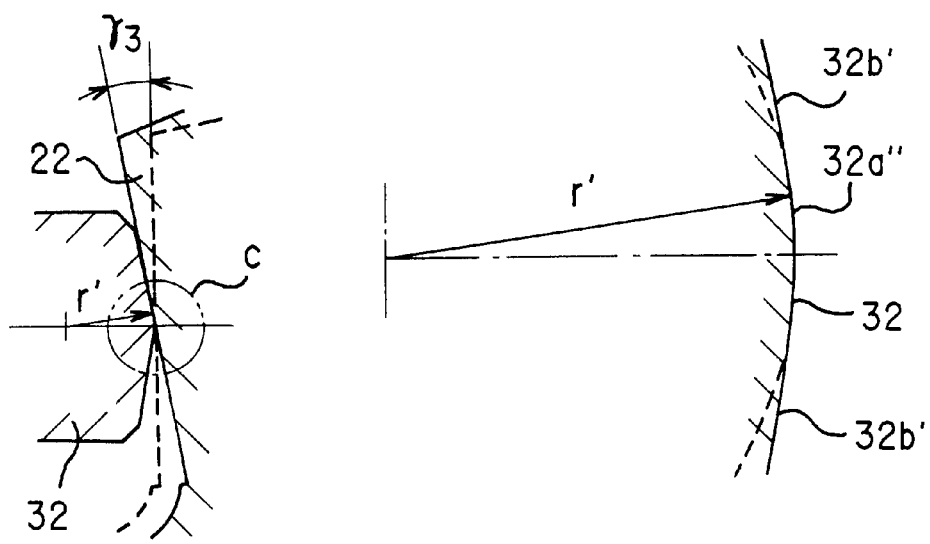

CONSTANT VELOCITY UNIVERSAL JOINT

BACKGROUND OF THE INVENTION

1. Field of the Invention

The present invention relates to a plunging tripod-type constant velocity universal joint. In general, a constant velocity universal joint is one of universal joints capable of transmitting torque at constant velocity even when two shafts, namely, driving and driven shafts are joined together to form an angle. Of these joints, a plunging type allows a relative axial displacement between the two shafts by means of the plunging form of the joint, and a tripod type performs torque transmission with such a construction that a tripod member having three radially protruding trunnions is coupled to one of the shafts; a hollow cylindrical outer joint member having three axially extending track grooves is coupled to the other shaft; and the trunnions of the tripod member are accommodated in their corresponding track grooves of the outer joint member.

2. Description of the Related Art

One example of plunging tripod-type constant velocity universal joints will be described with reference to FIGS. 10A–10C. An outer joint member 1 has in its inner circumferential surface three axially extending cylindrical track grooves 2. A tripod member 4, inserted into the outer joint member 1, has three radially protruding trunnions 5 formed therein. On the cylindrical outer circumferential surface of each of the trunnions 5 is rotatably fitted an annular roller 7 via a plurality of needle rollers 6. The roller 7 is fitted in the track groove 2. A pair of roller guide surfaces 3 of each track groove 2 circumferentially opposed to each other are formed as concavely curved surfaces parallel to the axial direction, and the roller 7 of each of the three trunnions 5 has its outer circumferential surface formed as a convexly curved surface fitted in the roller guide surface 3. The rollers 7 are received in the roller guide surfaces 3 of their corresponding track grooves 2 so as to be movable along the track grooves 2 while rotating about the trunnions 5.

As shown in FIG. 10B, when torque is transmitted in a state where the joint takes an operating angle Θ, the roller 7 and the roller guide surface 3 come into an obliquely intersecting relation to each other as shown in FIG. 10C. In this case, although the roller 7 tends to roll and move in a direction indicated by an arrow t in FIG. 10B, because the track groove 2 forms a part of the cylindrical surface parallel to the axis of the outer joint member, the roller 7 results in moving while being constrained by the track groove 2. As a result, slippage occurs between the roller guide surface 3 and the roller 7. This leads to occurrence of sliding resistance and further to occurrence of induced thrust in the axial direction. The sliding resistance and the induced thrust cause vibrations of a car body and noise, adversely affect the noise, vibration, or hardness (hereinafter "NVH") performance of automobiles, and reduce flexibility in designing of car driving mechanisms, and thus should desirably be maintained.

As an example of plunging tripod-type constant velocity universal joints intended for reduction in such sliding resistance and induced thrust, there is known a construction shown in FIGS. 11A–11C. Specifically, as seen from the figure, a trunnion 5 of a tripod member 4 has a genuine spherical outer circumferential surface, and, on this genuine spherical outer circumferential surface is slidably fitted a cylindrical inner circumferential surface of a cylindrical ring 8. The ring 8 and a roller 7 constitute a roller assembly which is relatively rotatable via rolling elements. Needle rollers 6 are arranged between the cylindrical outer circumferential surface of the ring 8 and the cylindrical inner circumferential surface of the roller 7 as a so-called full complement of rollers, and are prevented from slipping off by an annular washer 9. The roller 7 is held inside a track groove 2 of an outer joint member 1 so as to be movable axially of the outer joint member 1 while rolling on a roller guide surface 3 of the track groove 2.

The trunnion 5 has its outer circumferential surface formed as a genuine spherical surface with its center of curvature located on the axis of the trunnion 5. The roller assembly (7 and 8) oscillates around the center of curvature. Since the roller assembly is free to oscillate, when torque is transmitted in a state where the outer joint member 1 and the tripod member 4 form an operating angle, the roller 7 is guided by the roller guide surface 3 of the outer joint member 1 so as to be kept parallel to the axis of the outer joint member 1, so that it correctly rolls on the roller guide surface 3 while being maintained in that position. This helps reduce sliding resistance occurring at the time when the joint operates at an operating angle and thus suppress the generation of sliding resistance and induced thrust.

As is conventionally known, a plunging tripod-type constant velocity universal joint is used to transmit torque from the engine system of an automobile to the wheels at constant velocity. The plunging tripod-type constant velocity universal joint has a spherical roller attached to the trunnion of the tripod member thereof. Between the outer circumferential surface of the trunnion and the inner circumferential surface of the spherical roller are arranged needle rollers acting as rolling elements as a full complement of rollers without a retainer. When torque is transmitted in a state where an operating angle is formed, induced thrust occurs during rotation due to mutual frictions occurring among the inner components. Further, even when the joint is deactivated, if the components are forced to be axially stretched, sliding resistance occurs. In regards to typical NVH phenomena encountered by automobiles, there are known, as one associated with induced thrust, transverse vibration of a car body occurring during running, and, as one associated with sliding resistance, an idling vibration phenomenon occurring when an automatic is at a stop with the range shifted to the drive or D-range.

NVH-related problems encountered by automobiles can be solved by reducing induced thrust and sliding resistance occurring in a joint in use. In general, since induced thrust and sliding resistance occurring in a joint tends to be dependent on the degree of the operating angle, the joint, when applied to a driving shaft of an automobile, needs to be designed under the constraint that the operating angle should be kept small. Thus, flexibility in designing car driving mechanisms of an automobile cannot be improved without reducing and stabilizing induced thrust and sliding resistance.

SUMMARY OF THE INVENTION

An object of the present invention is therefore to further reduce and stabilize such induced thrust and sliding resistance.

A constant velocity universal joint according to a first aspect of the present invention is provided with: an outer joint member having three track grooves formed therein, each of the track grooves having its roller guide surfaces arranged circumferentially opposed to each other; a tripod member having three radially protruding trunnions; a roller fitted in the track groove; and a ring fitted on each of the trunnions for rotatably supporting the roller so that the roller is movable axially of the outer joint member along the roller guide surface. In the constant velocity universal joint, the outer circumferential surface of the trunnion has a straight shape, as viewed in the longitudinal section, but has, as viewed in the cross section, a shape which allows contact with the inner circumferential surface of the ring in a direction orthogonal to the axis of the joint and allows creation of a gap between the outer circumferential surface and the inner circumferential surface of the ring in the axial direction of the joint, and wherein the ring has an inner circumferential surface shaped such that its diameter increases gradually from the axial central portion of the ring to the end-face side thereof.

Instead of being circular-shaped, as has been conventional, the outer circumferential surface of the trunnion is given a novel shape as described above. This allows, when the joint takes an operating angle, the trunnion to be inclined with respect to the outer joint member without changing the position of the roller assembly. Moreover, as is apparent from the contrast between FIG. 1C and FIG. 11C, a transversely elongated contact ellipse the outer circumferential surface of the trunnion forms with the ring is made approximate to a point. This helps reduce frictional moment acting to tilt the roller assembly. Therefore, the position of the roller assembly is stable at all times and thus the roller is maintained parallel to the roller guide surface, thereby achieving smooth rolling. Consequently, sliding resistance, as well as induced thrust, can be reduced.

Since the ring has an inner circumferential surface shaped such that its diameter increases gradually from the axial central portion to the end-face side, within a plane perpendicular to the joint axis, a comparatively large relative inclination is allowed between the trunnion and the ring. As a result, even where the roller assembly is forced to be slightly inclined with respect to the outer joint member, the smooth rotation of the roller assembly can be maintained without interference between the trunnion and the ring. Specific examples of such a ring as has an inner circumferential surface shaped such that its diameter increases gradually from the axial central portion to the end-face side includes: a ring having an inner circumferential surface in which the generatrix is composed of a part of an ellipse with its major axis extended in a direction orthogonal to the axis of the ring; and a ring having an inner circumferential surface in which the generatrix is composed of a combination of a circular arc with its radius of curvature made smaller in the central portion and a tangential line extending from both ends of the arc to the end face of the ring. In either case, since the width dimension of the ring is limited, the smaller the radius of curvature of the central portion of the generatrix, the larger the allowable relative inclination angle with respect to the trunnion can be secured. Here, it should be added that, the smaller the radius of curvature, the larger the contact surface pressure, and thus the range of the contact pressure needs to be defined from the strength and durability standpoints. In other words, it is preferable that the radius of curvature in question be made as small as possible so long as the contact surface pressure does not exceed the allowable upper limit.

The roller assembly is interposed between the trunnion and the outer joint member to serve to transmit torque. In a constant velocity universal joint of this type, since a direction in which torque is transmitted constantly coincides with a direction orthogonal to the axis of the joint, by bringing the trunnion into contact with the ring in the torque transmission direction, torque can be transmitted properly. Therefore, even though there exists a gap therebetween in the axial direction of the joint, it never occurs that the torque transmission is hindered.

Note that, although the ring and the roller constitute a roller assembly free to relatively rotate, they may make sliding contact with each other, or may have a plurality of rolling elements between them. Examples of the rolling element include a cylindrical roller, such as a needle roller, and a ball.

A constant velocity universal joint according to the second aspect of the present invention is characterized in that the generatrix of the inner circumferential surface of the ring forms a part of an ellipse with its major axis extended in a direction orthogonal to the axis of the ring.

A constant velocity universal joint according to the third aspect of the present invention is characterized in that the generatrix of the inner circumferential surface of the ring is composed of a combination of a central convex circular arc and a tangential line extending from the end portion of the convex circular arc to the end face of the ring.

A constant velocity universal joint according to the fourth aspect of the present invention is characterized in that when the joint is put under basic torque, a contact surface pressure between the trunnion and the ring is set to a range of 270 to 440 kgf/mm$^2$.

A constant velocity universal joint according to the fifth aspect of the present invention is characterized in that when the joint is put under basic torque, the maximum contact surface pressure between the trunnion and the ring is set at 440 kgf/mm$^2$, and that the radius of curvature of the inner circumferential surface of the ring is made as small as possible.

A constant velocity universal joint according to the sixth aspect of the present invention is characterized in that an allowable relative inclination angle between the trunnion and the ring in a loading direction is set to a range of 2 to 5°.

The present invention provides a constant velocity universal joint including: an outer joint member having three track grooves formed therein, the track groove having roller guide surfaces arranged circumferentially opposed to each other; a tripod member having three radially protruding trunnions; a roller fitted in the track groove; and a ring fitted on each of the trunnions for rotatably supporting the roller so that the roller is movable axially of the outer joint member along the roller guide surface. In this constant velocity universal joint, the outer circumferential surface of the trunnion has straight shape, as viewed in the longitudinal section, but has, as viewed in the cross section, a shape which allows contact with the inner circumferential surface of the ring in a direction orthogonal to the axis of the joint and allows creation of a gap between the outer circumferential surface and the inner circumferential surface of the ring in the axial direction of the joint, and wherein the ring has an inner circumferential surface shaped such that its diameter increases gradually from the axial central portion of the ring to the end-face side thereof. In this construction, when the joint takes an operating angle, the trunnion can be inclined with respect to the outer joint member without changing the position of the roller assembly. Moreover, the transversely elongated contact ellipse between the outer circumferential surface of the trunnion and the ring is made approximate to a point. This helps reduce frictional moment acting to tilt the roller assembly. Therefore, the position of the roller assembly is stable at all times and thus the roller is maintained parallel to the roller guide surface, thereby achieving smooth rolling. This contributes to reduction not only in sliding resistance but also in induced thrust.

Particularly, since the ring has an inner circumferential surface shaped such that its diameter increases gradually from the axial central portion to the end-face side, within a plane perpendicular to the joint axis, a comparatively large relative inclination is allowed between the trunnion and the ring. As a result, even where the roller assembly is forced to be slightly inclined with respect to the outer joint member, the smooth rotation of the roller assembly can be maintained without interference between the trunnion and the ring.

The constant velocity universal joint embodying the present invention is suitable particularly for an automobile's drive shaft, because its use makes it possible to improve automobile's NVH performance associated with the degree of sliding resistance and induced thrust, and to increase flexibility in designing car driving mechanisms.

The nature, principle, and utility of the invention will become more apparent from the following detailed description when read in conjunction with the accompanying drawings in which like parts are designated by like reference numerals or characters.

BRIEF EXPLANATION OF THE DRAWINGS

In the accompanying drawings:

FIG. 1A is a cross sectional view of a constant velocity universal joint of an embodiment of the present invention;

FIG. 1B is a vertical sectional view of a trunnion and a roller assembly;

FIG. 1C is a sectional view of a ring;

FIG. 4 is an enlarged sectional view of the ring depicted in FIGS. 3A–3C;

FIG. 11A is a cross sectional view of another conventional tripod-type constant velocity universal joint;

FIG. 11B is a vertical sectional view of a trunnion;

FIG. 11C is a sectional view of a ring for explaining a contact ellipse;

FIG. 13A is a sectional view similar to FIG. 12B according to a fourth embodiment;

FIG. 13B is a sectional view similar to FIG. 12B according to a fifth embodiment;

FIG. 13C is an enlarged view of the C portion depicted in FIG. 13B.

DETAILED DESCRIPTION OF THE PREFERRED EMBODIMENTS

Figure 2A:
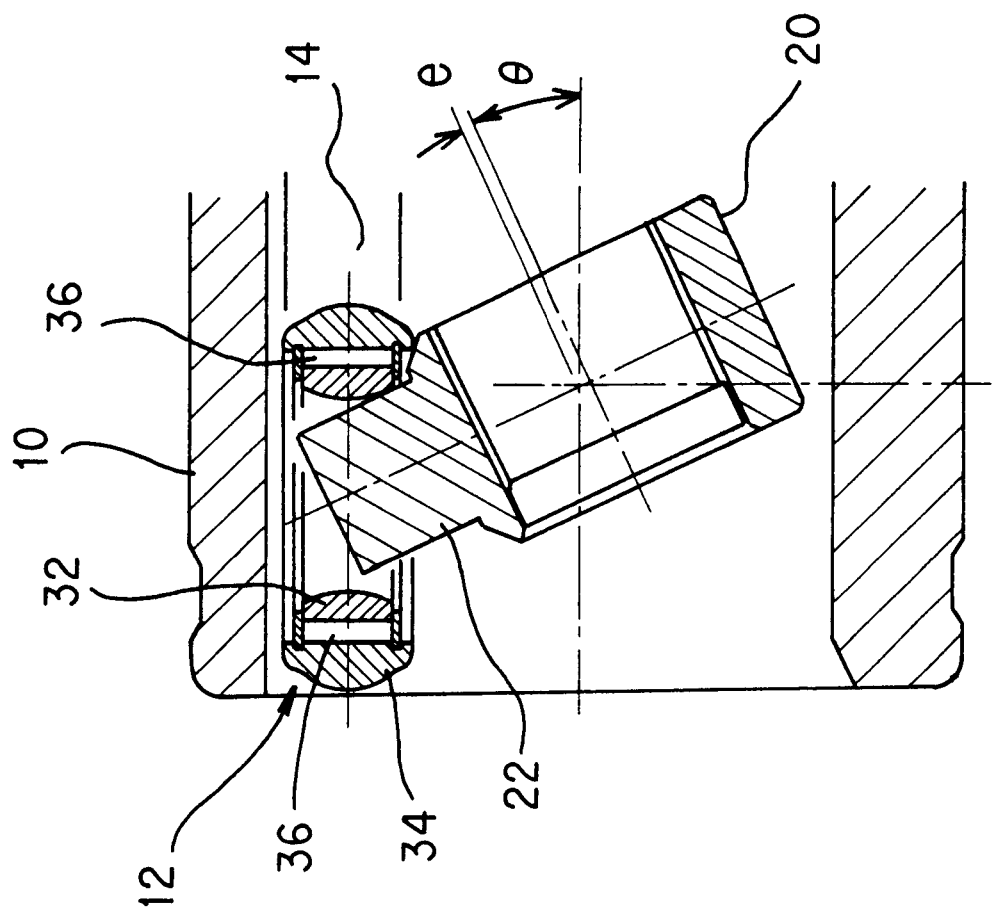
FIG. 2A is a longitudinal sectional view of the constant velocity universal joint of FIGS. 1A–1C, illustrating a state where an operating angle is formed.

First, a description will be given below as to an embodiment shown in FIGS. 1A–1C and 2A and 2B. Of these figures, FIG. 1A shows the cross section of the joint; FIG. 1B shows the section thereof perpendicular to the trunnion; and FIG. 2A shows the longitudinal section of the joint in a state where an operating angle θ is formed. As shown in FIGS. 1A–1C, the constant velocity universal joint is composed of an outer joint member 10 and a tripod member 20. Of the two shafts for use in coupling, one is connected to the outer joint member 10 and the other is connected to the tripod member 20.

The outer joint member 10 has three axially extending track grooves 12 formed in the inner circumferential surface thereof. A pair of side walls of the track groove 12 circumferentially opposed to each other each have a roller guide surface 14. The tripod member 20 has three radially protruding trunnions 22, of which each is attached to a roller 34. The roller 34 is held in the track groove 12 of the outer joint member 10. The roller 34 has its outer circumferential surface formed as a convexly curved surface fitted in the roller guide surface 14.

The outer circumferential surface of the roller 34 is formed as a convexly curved surface in which the generatrix is defined with a circular arc with its center of curvature located in a position radially away from the axis of the trunnion 22. The sectional configuration of the roller guide surface 14 assumes a Gothic arch, so that the roller 34 and the roller guide surface 14 make angular contact with each other. In FIG. 1A, a line of action for the contact position of the two components is indicated by a chain line. Even though the roller guide surface 14 is given a taper sectional configuration, it can make angular contact with the roller having a spherical outer circumferential surface. By adopting such a construction in which the roller 34 and the roller guide surface 14 make angular contact with each other, the roller 34 swings little and thus the position becomes stable. Note that, where the angular contact is not adopted, for example, the roller guide surface 14 may be composed of a part of a cylindrical plane with its axis arranged parallel to the axis of the outer joint member 10, and the sectional configuration thereof may assume a circular arc corresponding to the generatrix of the outer circumferential surface of the roller 34.

On the outer circumferential surface of the trunnion 22 is fitted a ring 32. The ring 32 and the roller 34 are assembled into a unit with a plurality of needle rollers 36 therebetween so as to constitute a relatively rotatable roller assembly. That is, the cylindrical outer circumferential surface of the ring 32 acts as an inner raceway surface, and the cylindrical inner circumferential surface of the roller 34 acts as an outer raceway surface. Needle rollers 36 are interposed between the inner and outer raceway surfaces so as to be rollable. As shown in FIG. 1B, the needle rollers 36 are arranged in as large a number as possible without a retainer, i.e., arranged as a so-called full complement of rollers. Reference numerals 33 and 35 represent a pair of washers attached to the annular grooves formed in the inner circumferential surface of the roller 34 for preventing the needle rollers 36 from slipping off. The washer 33 (and 35) has a notch formed in its certain position in the circumferential direction (see FIG. 6B), so that it is attached to the annular groove formed in the inner circumferential surface of the roller 34 with its diameter elastically decreased.

The outer circumferential surface of the trunnion 22 assumes a straight shape parallel to the axis of the trunnion 22, as viewed in the longitudinal section (FIG. 2A), but assumes an elliptical shape with its major axis arranged orthogonal to the axis of the joint, as viewed in the cross section (FIG. 1B). The sectional configuration of the trunnion assumes an approximately elliptical shape, which is realized by reducing the axial wall thickness of the trunnion as viewed in a plane containing the axis of the tripod member 20. In other words, in the sectional configuration of the trunnion, those areas opposing each other axially of the tripod member are situated away from an imaginary cylindrical section.

The inner circumferential surface of the ring 32 has a circular arc convex section. That is, the generatrix of the inner circumferential surface is defined with a convex circular arc having a radius of r (FIG. 1C). In addition to this, as described above, the cross sectional configuration of the trunnion 22 assumes an approximately elliptical shape, and a predetermined gap is provided between the trunnion 22 and the ring 32. Thus, the ring 32 is not only movable axially of the trunnion 22 but also oscillatable with respect to the trunnion 22. Further, as described previously, the ring 32 and the roller 34 are assembled into a unit with needle rollers 36 therebetween so as to be relatively rotatable. This allows the ring 32 and the roller 34, acting as a unit, to be in an oscillatable relation with respect to the trunnion 22. Here, the "oscillating" means that, within a plane including the axis of the trunnion 22, the axes of the ring 32 and the roller 34 are inclined with respect to the axis of the trunnion 22 (see FIG. 2A).

In the conventional joint shown in FIGS. 11A–11C, since the outer circumferential surface of the trunnion 5 wholly makes contact with the inner circumferential surface of the ring 8, as indicated by a broken line in FIG. 11C, the contact ellipse is transversely elongated circumferentially. Thus, when the trunnion 5 is inclined with respect to the outer joint member 1, with the movement of the trunnion 5, frictional moment occurs that acts to tilt not only the ring 8, but also the roller 7. In contrast, in the embodiment shown in FIGS. 1A–1C, since the trunnion 22 has an approximately elliptical cross section and the inner circumferential surface of the ring 32 has a cylindrical cross section, as indicated by a broken line in FIG. 1C, the contact ellipse is made approximate to a point and thus decreases in area, with the result that a force acting to tilt the roller assembly (32 and 34) is significantly reduced as compared with the conventional ones, thereby further stabilizing the position of the roller 34. Moreover, in the conventional joint shown in FIGS. 11A–11C, in a state where no operating angle is formed, as shown in FIG. 11A, the contact portion between the trunnion 5 and the ring 8 exists in the axial central portion of the ring 8. On the other hand, when torque is transmitted in a state where the joint takes an operating angle, the trunnion 4 swings in the front- and rear-side directions as viewed in the paper sheet showing FIG. 11A. This causes the contact portion between the trunnion 5 and the ring 8 to shift downwardly from the axial central portion of the ring 8. As a result, the behavior of the needle roller 6 becomes unstable, and this makes stable rolling impossible. In contrast, in the embodiment shown in FIGS. 1A–1C, the contact portion between the trunnion 22 and the inner circumferential surface of the ring 32 exists in the axial central portion of the ring 32 at all times, thereby permitting the needle roller 36 to roll with stability.

Figure 3C:
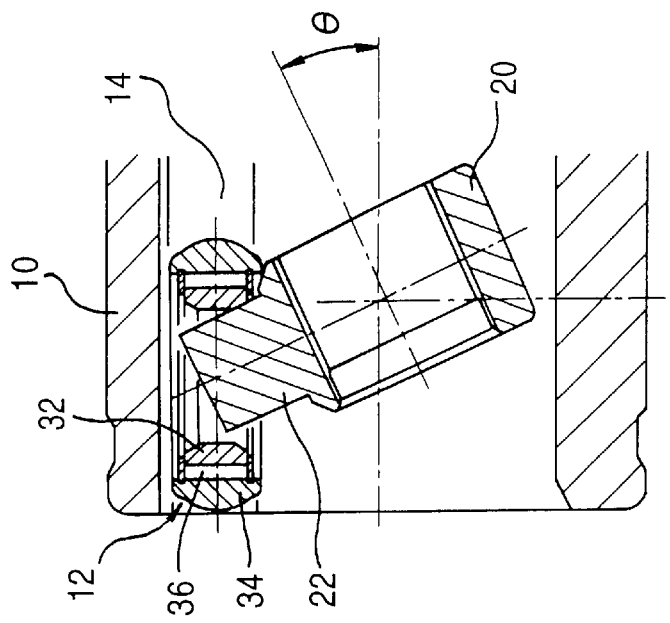
FIG. 3C is a longitudinal sectional view of the constant velocity universal joint, illustrating a state where an operating angle is formed.
Figure 3B:
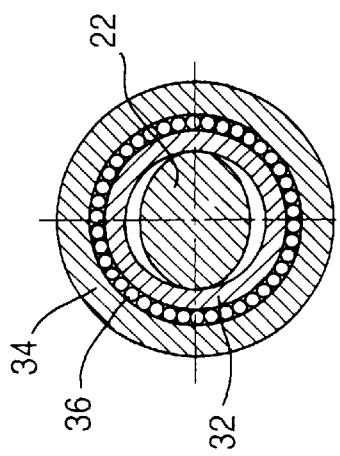
FIG. 3B is a vertical sectional view of the trunnion and the roller assembly.
Figure 3A:
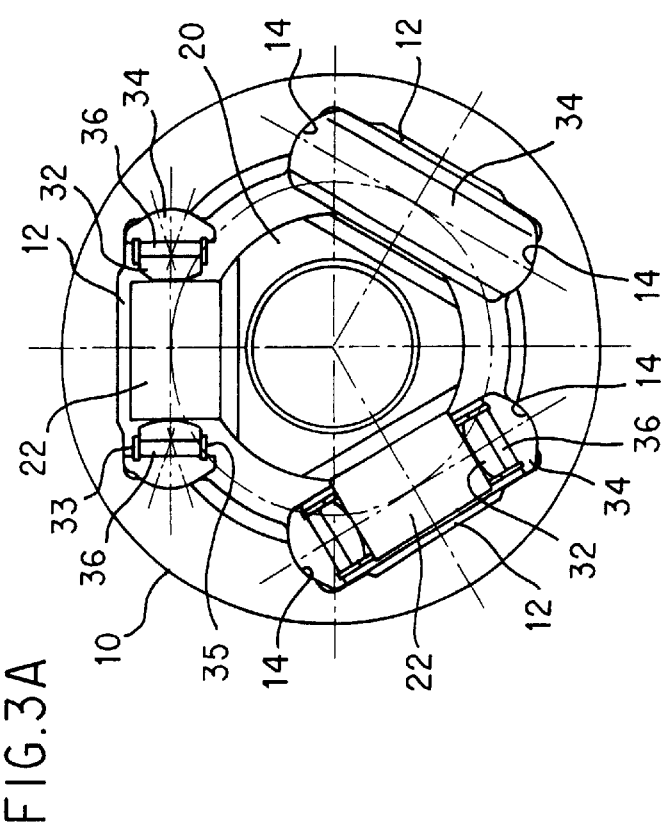
FIG. 3A is an end view of the partial section of the constant velocity universal joint, according to a second embodiment of the present invention.

Next, a description will be given below as to an embodiment shown in FIGS. 3A–3B and 4. Note that, in FIG. 3A showing part of the components, namely, the ring 32, the roller 34, and the washers 33 and 35 in section, hatching representing a section is omitted to avoid convergence occurring among leader and center lines. This embodiment is constructed basically in the same manner as the above-described embodiment except that, in the former, the generatrix of the inner circumferential surface of the ring 32 is, unlike that of the latter composed of a single circular arc, composed of a combination of a central circular arc portion 32a and clearance portions 32b lying at both ends thereof. The clearance portion 32b, provided to avoid interference with the trunnion 22 when an operation angle θ is formed as shown in FIG. 3C, is composed of a straight line or a curve such that its diameter increases gradually from the end of the circular arc portion 32a to the end portion of the ring 32. Here, the clearance portion 32b is illustrated as a part of a conical surface with a conic angle α of 50°. The circular arc portion 32a is given a radius of curvature r as large as, for example, 30 mm to allow an inclination of about 2 to 3° of the trunnion 22 with respect to the ring 32.

Figure 12A:
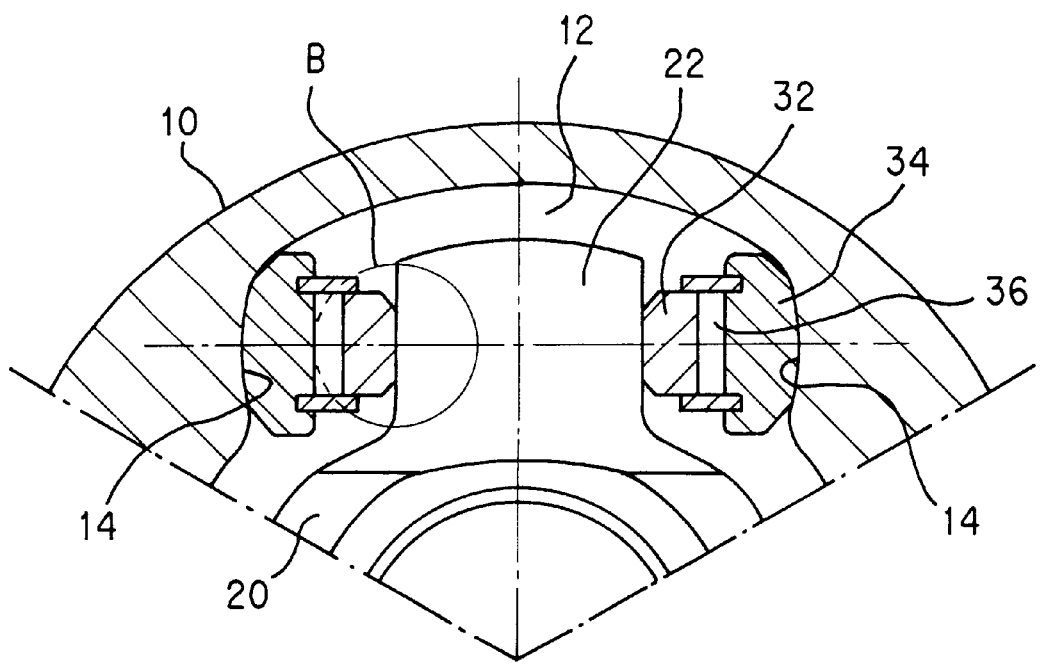
FIG. 12A is a cross sectional view of a constant velocity universal joint.
Figure 12B:
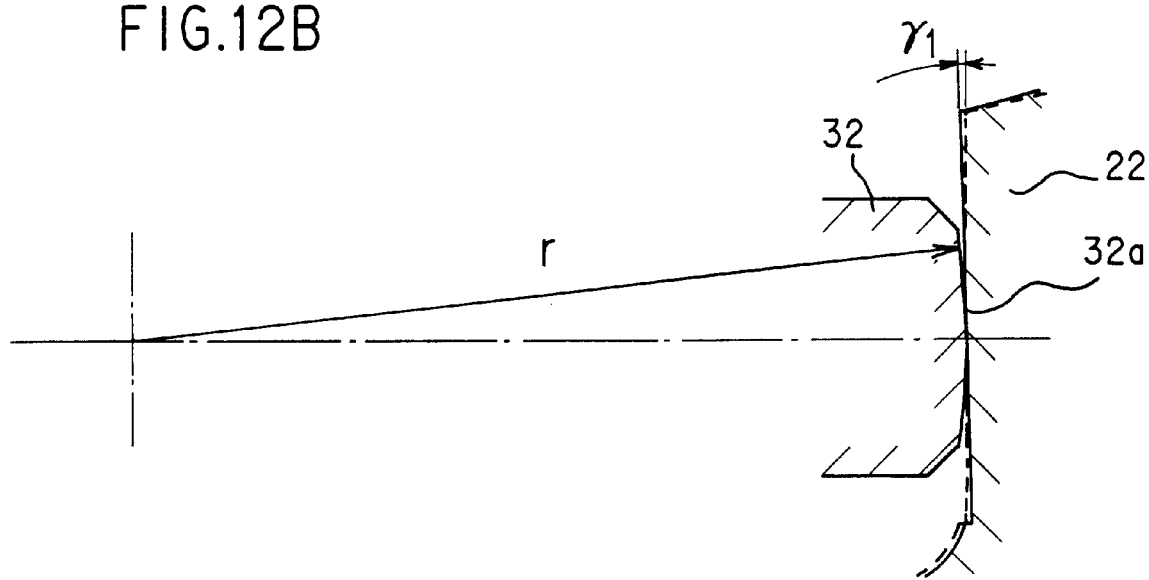
FIG. 12B is an enlarged view of the B portion depicted in FIG. 12A.

FIGS. 12A–12B shows a state where the trunnion 22 and the ring 32 make contact with each other, as observed in the above-described embodiment. That is, the cross sectional configuration of the trunnion 22 assumes an ellipse with its major axis arranged orthogonal to the axis of the joint, and the generatrix of the inner circumferential surface of the ring 32 is defined with a convex circular arc 32a with a large radius of curvature r which makes contact with the outer circumferential surface of the trunnion 22 with a given gap therebetween. Within a plane perpendicular to the axis of the joint (FIGS. 12A–12B), to properly control the position of the roller assembly (32 and 34) with respect to the outer wheel 10, the gap is made as slight as possible to restrict inclination. An allowable relative inclination angle between the trunnion 22 and the ring 32 is represented by a numerical symbol γ1 in FIG. 12B. However, due to a gap setting for each portion constituting the joint, the roller assembly (32 and 34) is inevitably inclined somewhat with respect to the outer wheel 10 within the plane perpendicular to the axis of the joint. This causes a relative inclination between the trunnion 22 and the ring 32, with the result that unwanted interference occurs therebetween and thereby the NVH performance of the joint is adversely affected.

To avoid unwanted interference between the trunnion 22 and the ring 32, in an embodiment illustrated in FIGS. 13A–13C, the generatrix of the inner circumferential surface of the ring 32 is composed of a convex circular arc 32a' constituting a part of an ellipse E with its major axis a extended in a direction orthogonal to the axis of the ring 32 and a minor axis b perpendicular to the major axis a. By doing so, the outer circumferential surface of the ring 32 is so shaped as to be gradually farther away from the trunnion 22 from the axial central portion of the ring 32 to the end face thereof, with the result that, within the plane perpendicular to the axis of the joint (FIGS. 13A–13C), a given relative inclination is allowed between the trunnion 22 and the ring 32. The allowable relative inclination angle for the trunnion 22 and the ring 32 is represented by a numerical symbol y 2 in FIG. 13A.

In an embodiment shown in FIGS. 13B and 13C, the generatrix of the inner circumferential surface of the ring 32 is composed of a combination of a central convex circular arc 32a" whose single radius of curvature r' is made as small as the limitations of the contact surface pressure allow, and a tangential line 32b' which is smoothly joined to the end of the convex circular arc 32a" so as to reach the end face of the ring 32. By doing so, the inner circumferential surface of the ring 32 is so shaped as to be gradually farther away from the trunnion 22 from the axial central portion of the ring 32 to the end face thereof, with the result that, within the plane perpendicular to the axis of the joint, a given relative inclination is allowed between the trunnion 22 and the ring 32. The allowable relative inclination angle for the trunnion 22 and the ring 32 is represented by a numerical symbol γ3 in FIG. 13B. The relationship among the relative inclination angles γ1, γ2, and γ3 of FIGS. 12B, 13A, and 13B, respectively, is given as: γ1<γ2<γ3.

Table 1 lists, for each example, an allowable relative inclination angle γ; a contact surface pressure as observed when the joint is loaded with basic torque; and a surface-pressure increasing ratio for a case where the contact surface pressure of the construction shown in FIG. 12B is assumed to be 1.

TABLE 1

| Shape of generatrix of ring's inner circumferential surface | Allowable relative inclination angle γ | Contact surface pressure kgf/mm² | Surface pressure increasing ratio |
| --- | --- | --- | --- |
| Convex circular arc with larger radius of curvature (FIG. 12B) | ~2 | 260 | 1 |
| Ellipse (FIG. 13A) | 3~4 | 270 | 0.3~1.04 |
| Combination of convex circular arc with smaller radius of curvature and tangential line (FIG. 13B) | 4 | 390 | 1.50 |
|  | 5 | 440 | 1.70 |

As is understood from Table 1, in the construction shown in FIG. 12B, while the contact surface pressure between the trunnion 22 and the ring 32 is low, the allowable relative inclination angle is made as small as 2°. In contrast, the allowable relative inclination angle of the construction shown in FIG. 13A is made larger, and that of the construction shown in FIG. 13B is made still larger. Where the allowable relative inclination angle is set at 5°, the contact surface pressure is increased to 1.70, as compared with the construction shown in FIG. 12B. Thus, from strength and durability standpoints, it is preferable that the upper limit of the allowable relative inclination angle be set at about 5°, in other words, the maximum contact surface pressure between the trunnion and the ring be set at 440 kgf/mm² at the time when the joint is loaded with basic torque.

Figure 2B:
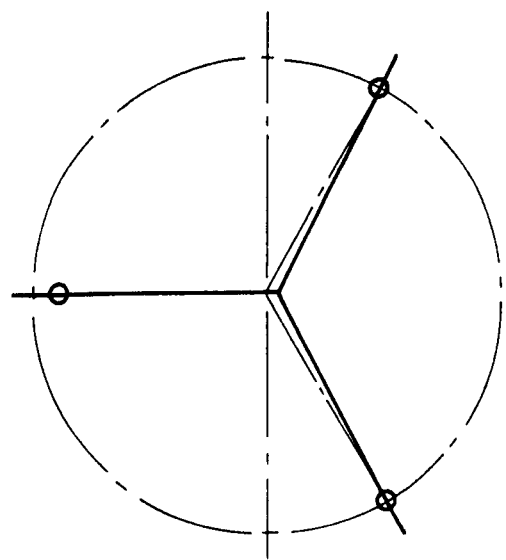
FIG. 2B is a schematic side view of the tripod member depicted in FIG. 2A.

The tripod-type constant velocity universal joint is so constructed that, when the outer joint member 10 makes one rotation, the tripod member 20 swings three times with respect to the center of the outer joint member 10. At this time, the decentering amount represented by a symbol e (FIG. 2A) increases in proportion to the degree of the operating angle θ. Meanwhile, the three trunnions 22 are spaced 120° apart from one another. When an operating angle θ is formed, as shown in FIG. 2B, assuming that the vertical trunnion 22 depicted in the upper part of the figure is the reference, the other two trunnions 22 slightly tilt with their axes deviated from the axes at an operating angle of 0 indicated by a chain line. For example, when the operating angle θ is set at about 23°, the inclination angle is made as small as about 2 to 3°. The inclination is allowed with ease by the curvature of the circular arc portion 32a of the inner circumferential surface of the ring 32, thereby preventing the surface pressure exerted upon the contact portion between the trunnion 22 and the ring 32 from excessively rising. Note that FIG. 2B schematically illustrates the three trunnions 22 of the tripod member 20 as seen on the left-hand side plane of FIG. 2A, wherein a solid line represents the trunnion. Moreover, between the major-axis diameter 2a of the trunnion 22 and the inside diameter of the ring 32 is provided a gap capable of accommodating an inclination of the trunnion 22 resulting from swinging about a trunnion, which is specific to such a tripod type constant velocity universal joint. The specific values of this gap will be described in detail in the paragraph as to Example.

Figure 5:
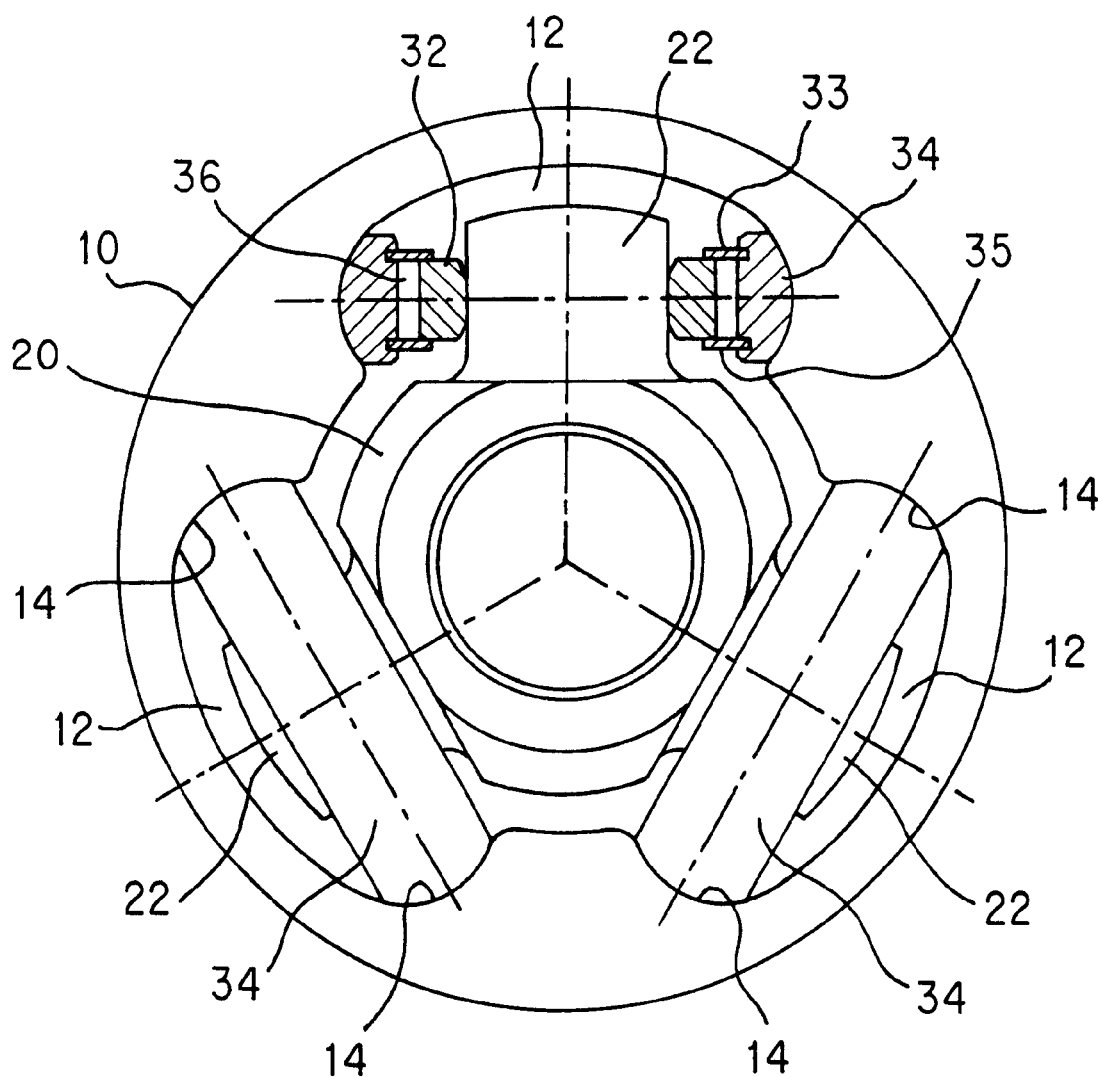
FIG. 5 is an end view of a partial section of a constant velocity universal joint, illustrating an outer joint member according to a third embodiment.

As shown in FIGS. 1A and 3A, in the above-described embodiments, in order for an inclination of the roller 34 to be restricted, on the back side of the track groove 12, i.e., on the larger-diameter side as viewed in the cross section of the outer joint member 10, is formed a collar opposed to the end face of the roller 34. However, in each embodiment, as well as in a subsequently-described example, the roller 34 can be successfully prevented from tilting, and therefore the track groove 12 does not necessarily have to be provided with a collar. That is, as shown in FIG. 5, a collar may be omitted. As a result, even though the roller 34 temporarily swings for some reason, it never occurs that the roller 34 comes into contact with the collar to produce sliding friction.

Example

Figure 6B:
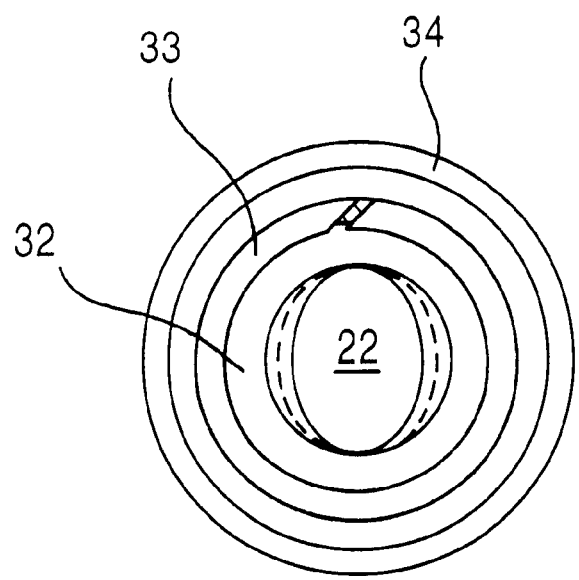
FIG. 6B is a plan view of the trunnion and the roller assembly.
Figure 6A:
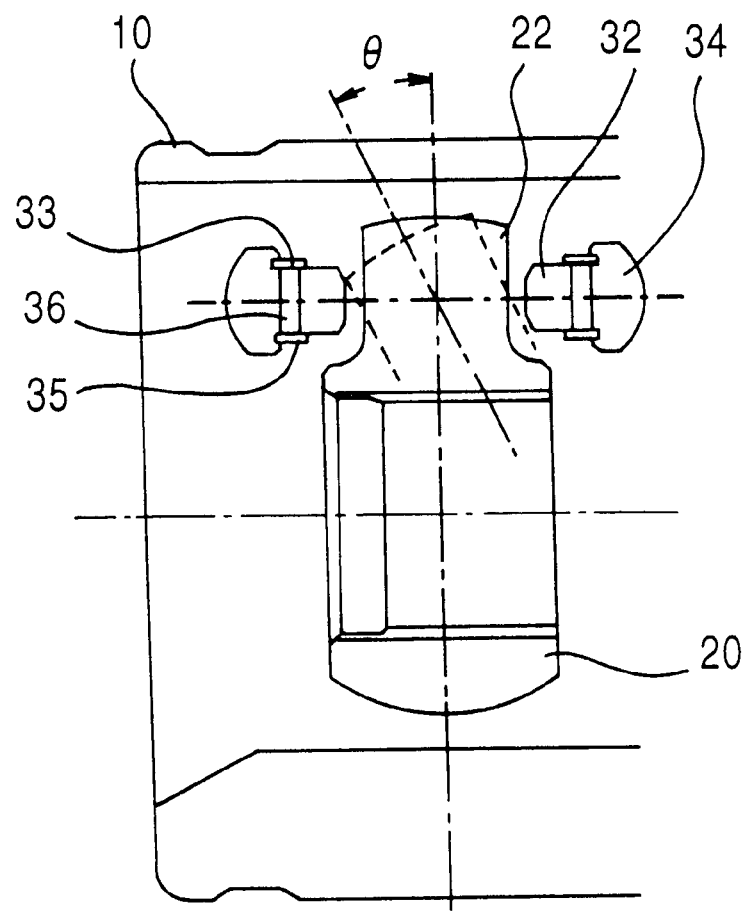
FIG. 6A is a longitudinal sectional view of a constant velocity universal joint.

In the construction embodying the present invention, as shown in FIGS. 6A–6B, torque is transmitted by bringing the trunnion 22 having an approximately elliptical cross section into contact with the circular ring 32. Thus, the resultant surface pressure needs to be reduced. Following are specific examples for the purpose. Note that, in the paper sheet showing FIG. 6B, the vertical direction corresponds to a load side, and the horizontal direction corresponds to a non-loaded side.

When torque is transmitted in a state where the joint takes an operating angle θ, as indicated by a broken line in FIGS. 6A–6B, the trunnion 22 reciprocally swings with respect to the ring 32 within the range of the operating angle θ. At this time, on the non-loaded side, a relatively large gap exists between the trunnion 22 and the ring 32. This allows the trunnion 22 to be swingable with respect to the ring 32 without interference therebetween. However, on the load side, the larger the operating angle θ and the larger the inclination of the trunnion 22, as indicated by a broken line in FIG. 6B, the larger the apparent curvature of the trunnion 22. If this curvature is larger than that of the inside diameter of the ring 32, the trunnion 22 comes in contact with the ring 32 at two points. From then on, it is unlikely that only the trunnion 22 can be freely inclined, that is, the ring 32, as well as the roller assembly (32 and 34), is inclined. Accordingly, the cross sectional configuration, particularly, the load-side shape of the trunnion 22 is determined so that only the trunnion 22 is inclined without interference with the ring 32 within a predetermined angle range.

Figure 7:
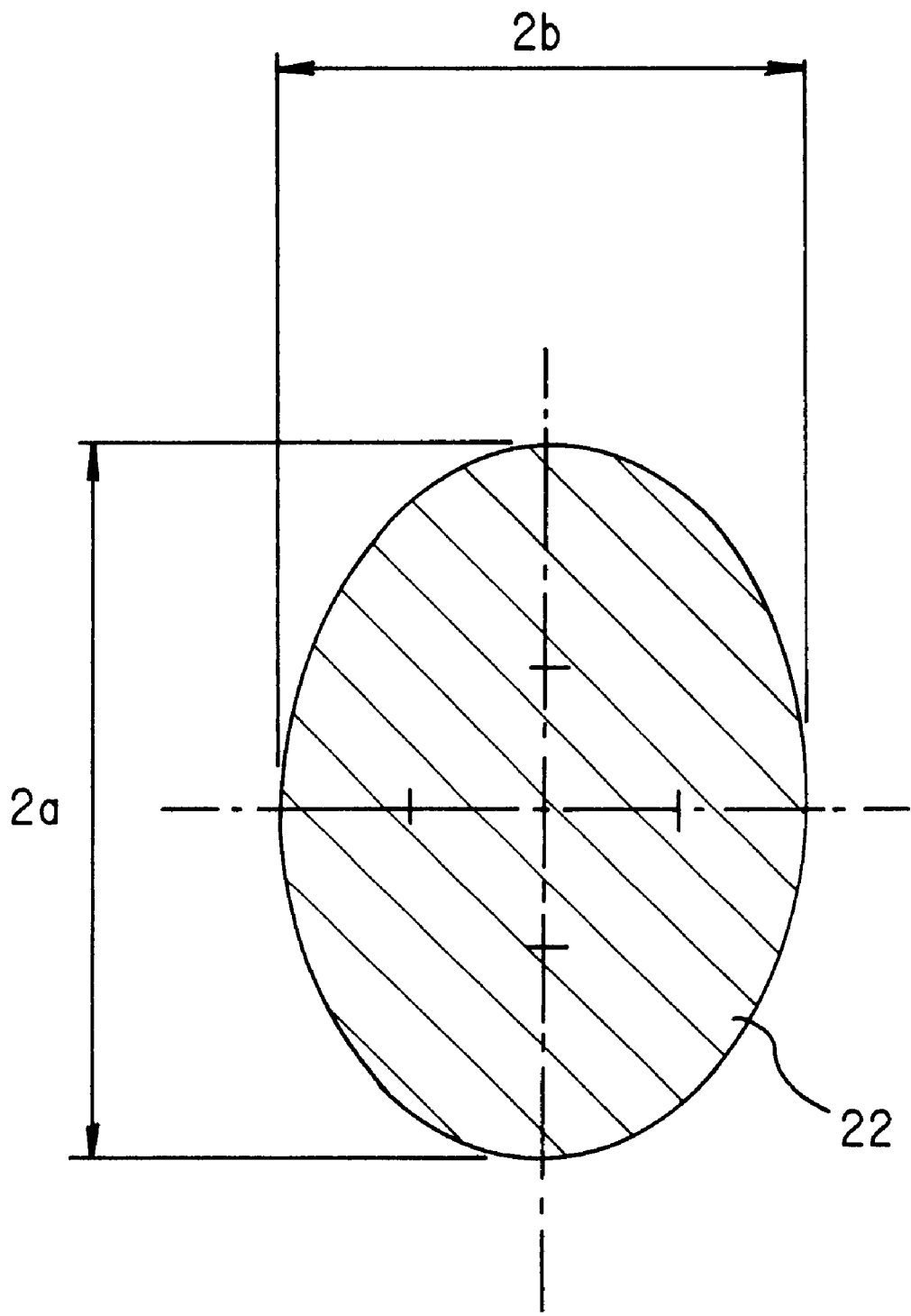
FIG. 7 is a cross sectional view of the trunnion.

Specifically, when the maximum operating angle θmax is assumed to be 25°, as shown in FIG. 7, a major-axis radius a and a minor-axis radius b of the approximately elliptical cross section of the trunnion 22 and a radius of curvature r of the inner circumferential surface of the ring (see FIGS. 1C and 4) are set as follows. Thereupon, even if the joint takes the maximum operating angle, the ring 32 is prevented from tilting, and the surface pressure between the trunnion 22 and the ring 32 is reduced to a minimum.

r=1.369a b/a=0.759

If the recommendable range of the radius of curvature r of the inner circumferential surface of the ring is assumed to extend from 0.5 r to 1.5 r, that is, from 0.684 a to 2.053 a, the resultant ellipticity b/a is set to a range of 0.836 to 0.647.

The configuration thus determined is feasible, but, in actual applications to automobiles, it is problematic in that the surface pressure between the trunnion 22 and the ring 32 is still unduly high. This inconvenience can be overcome by reducing the operating angle to a degree that the roller assembly (32 and 34) is no longer inclined on the understanding that lower vibration needs to be achieved at normal operating angles set for applications involving automobiles. For example, if a normal operating angle θ is set to exceed 10° but less than 20°, the optimal values and the recommendable range of the radius of curvature r of the inner circumferential surface of the ring and the ellipticity b/a listed in Table 2 will hold.

TABLE 2

| | Operating angle θ (°) | Optimal value (Minimum surface pressure) | Recommendable range 0.5 r | 1.5 r |
|---|---|---|---|---|
| r | 20 | 1.994a | 0.997a | 2.992a |
| | 15 | 2.898a | 1.449a | 4.347a |
| | 10 | 4.731a | 2.365a | 7.096a |
| b/a | 20 | 0.806 | 0.875 | 0.730 |
| | 15 | 0.859 | 0.914 | 0.801 |
| | 10 | 0.909 | 0.948 | 0.869 |

Figure 8:
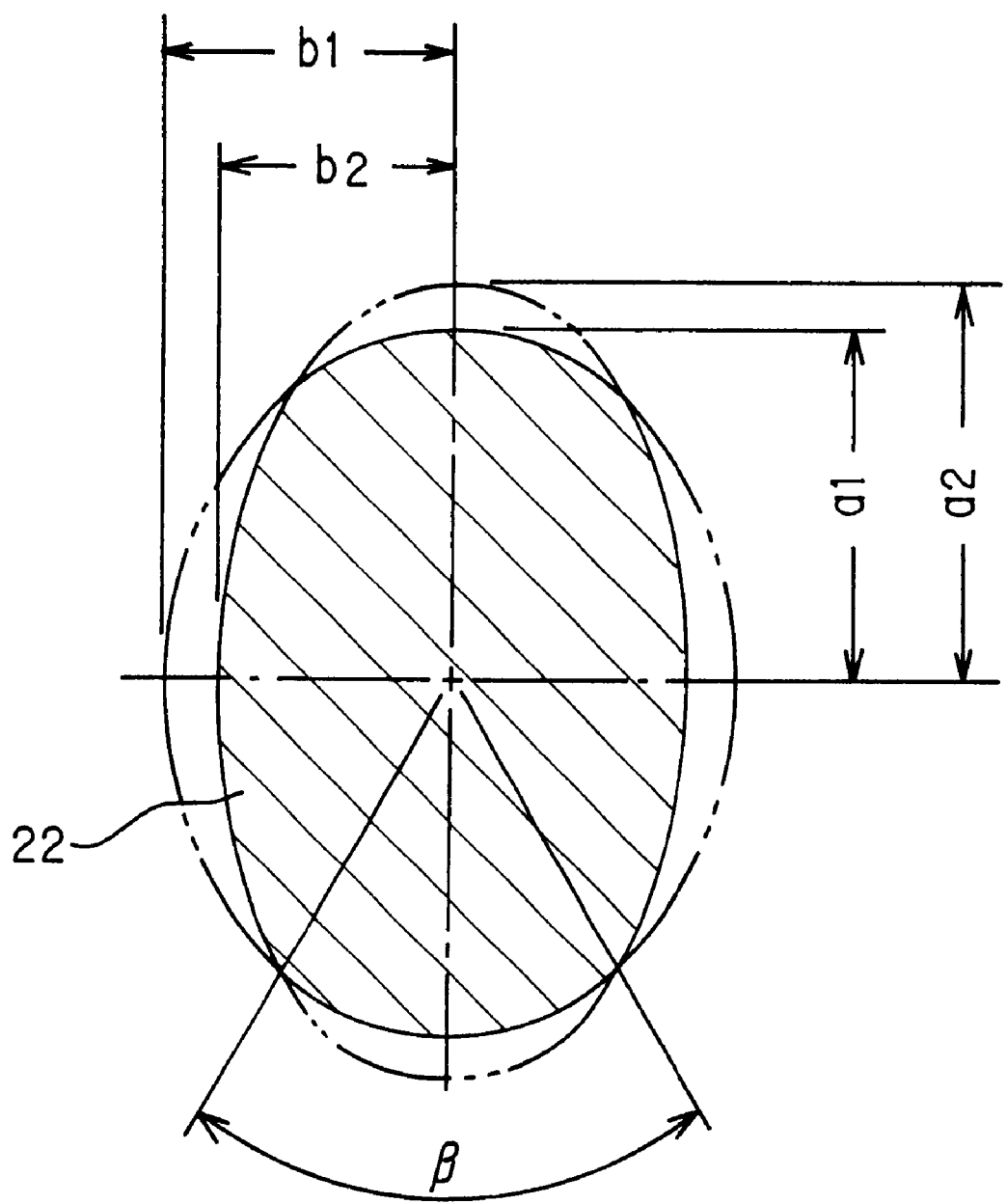
FIG. 8 is a cross sectional view of the trunnion.

As hereinabove discussed, even though an unduly large operating angle is formed, by making the ellipticity b/a of the approximately elliptical cross section of the trunnion 22 as small as possible, the trunnion 22 can be inclined without tilting the roller assembly (32 and 34). In this case, however, the surface pressure on the contact portion rises and the strength of the trunnion 22 decreases. To solve this problem, in the example shown in FIG. 8, the cross sectional configuration of the trunnion 22 assumes a compound ellipse in which only the region making contact with the ring 32, i.e., a contact region β is given a larger ellipticity b1/a1 and the other non-contact region is given an ellipticity b2/a2 of such a degree that no interference occurs at the maximum operating angle. For example, assuming that the normal operating angle θmax is 15° and that the radius of curvature r of the inner circumferential surface of the ring 32 is 2.898a, the ellipticity b1/a1 of the contact region is set at 0.859 and the ellipticity b2/a2 of the non-contact region is set at 0.635. Note that the cross section of the trunnion 22 takes a symmetrical shape. Thus, in FIG. 8, although the contact region β is depicted only in the lower portion of the figure, it is needless to say that the same contact region actually exists also in the upper portion of the figure.

Figure 9:
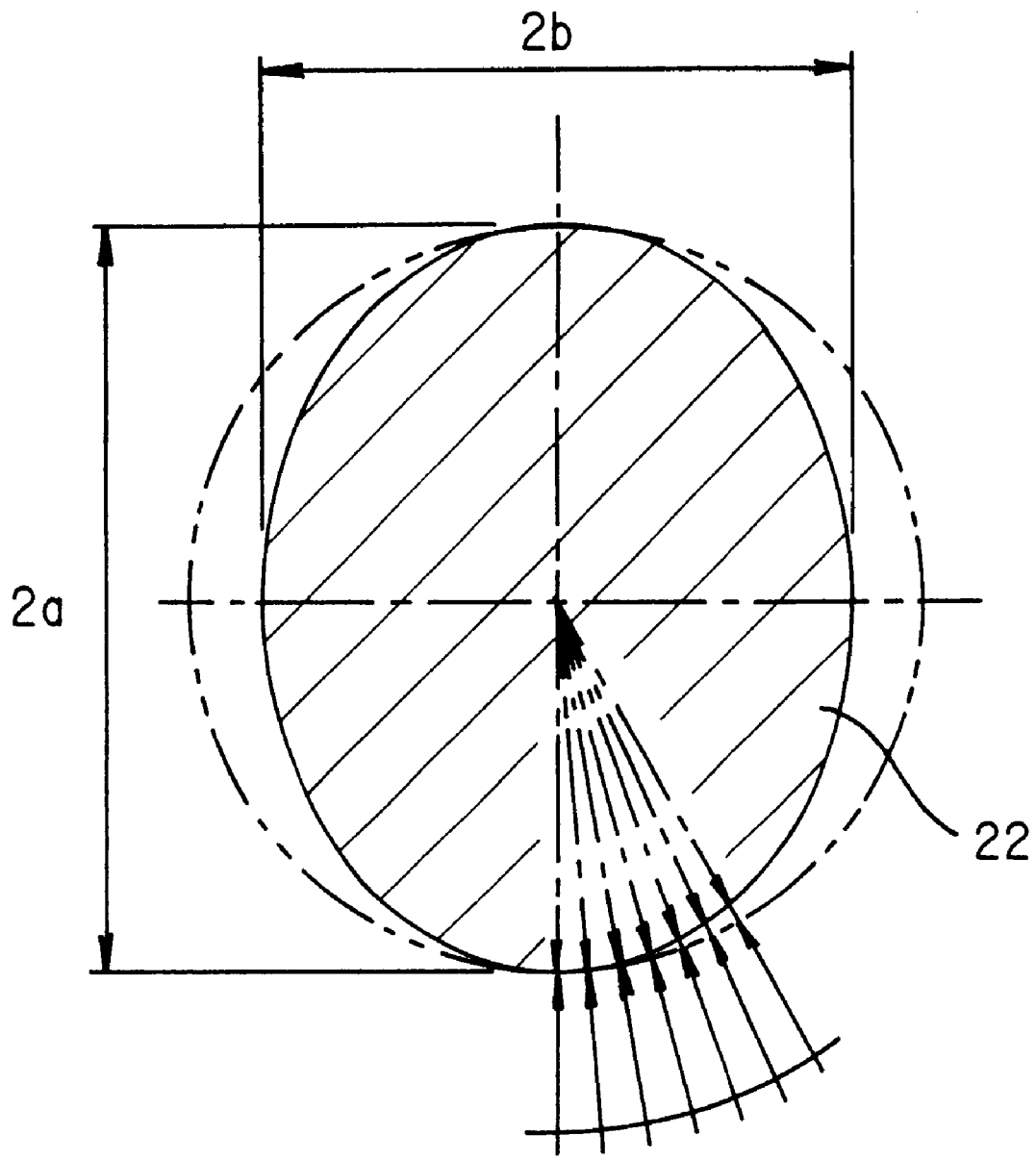
FIG. 9 is a cross sectional view of the trunnion.
Figure 10A:
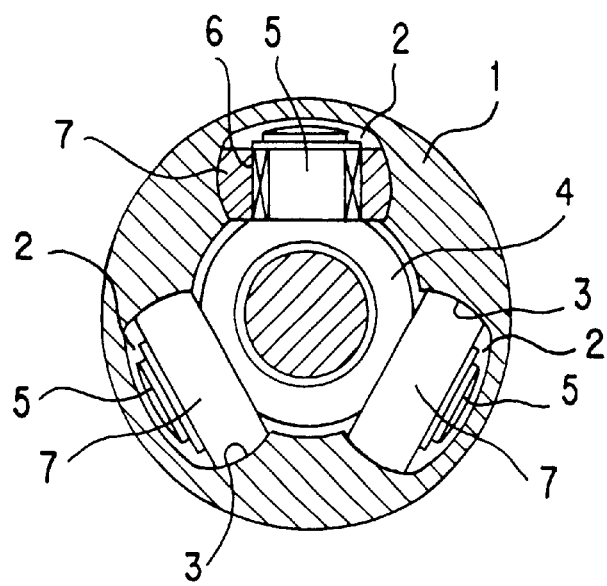
FIG. 10A is a cross sectional view of a conventional constant velocity universal joint.
Figure 10B:
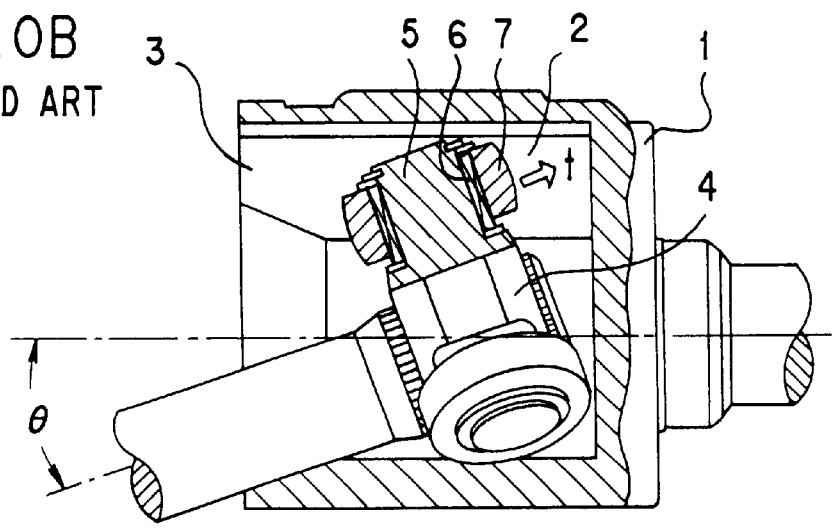
FIG. 10B is a longitudinal sectional view of the conventional constant velocity universal joint shown in FIG. 10A.
Figure 10C:
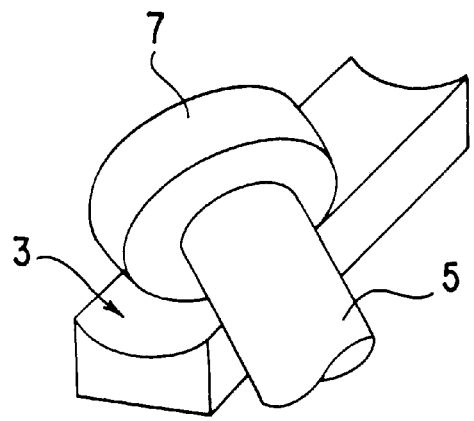
FIG. 10C is a schematic perspective view showing the mutual relationship between a roller and a roller guide surface depicted in FIG. 10B.

Moreover, in the example shown in FIG. 9, the contact region β is not composed of a single ellipse but realized by continuously varying the ellipticity (b/a). For example, likewise to the above, assuming that the normal operating angle θmax is 15° and that the radius of curvature r of the inner circumferential surface of the ring 32 is 2.898a. Then, in the contact region, the position intersected by the major axis has an ellipticity of 1.0. The ellipticity gradually decreases with distance from the above position, and is set at 0.635 in the non-contact region. Alternatively, the cross section may be shaped such that the ellipticity gradually decreases from 1.0 to 0.635, regardless of the region (contact or non-contact), from the major-axis side to the minor-axis side. In the example shown in FIG. 9, the position of the contact region intersected by the major axis has an ellipticity of 1.0, and, with distance from the above position, for example, as illustrated in the figure, the radius of curvature gradually decreases by a predetermined angle.

As described above, since the trunnion 22 has an approximately elliptical cross section, the following manner is acceptable. Only the load-side contact region (β) required to have high accuracy is subjected to grinding, and the other region, namely, the non-contact region is so shaped as to be made smaller in minor-axis diameter than a normal ellipse (indicated by a chain double-dashed line in FIG. 9) to form grinding clearance. Note that the non-contact region does not necessarily have to be provided with the grinding clearance portion by additionally performing certain processing, such as grinding, but may be so formed as to have the shape described just above during the forging of the trunnion. This helps reduce the machining time and thus the manufacturing cost.

To accommodate the inclination of the trunnion 22 resulting from swinging about the trunnion, which is specific to a tripod-type constant velocity universal joint, a gap is provided between the major-axis diameter 2a of the trunnion 22 and the inside diameter of the ring 32. The values thereof are listed in Table 3.

TABLE 3

| Operating angle θ (°) | r: Optimal value (Minimum surface pressure) | Minimum gap capable of accommodating swinging |
|---|---|---|
| 25 | 1.369a | $5.207 \times 10^{-3}a$ |
| 20 | 1.994a | $2.725 \times 10^{-3}a$ |
| 15 | 2.898a | $1.131 \times 10^{-3}a$ |
| 10 | 4.731a | $0.330 \times 10^{-3}a$ |

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A constant velocity universal joint comprising:
   an outer joint member having three track grooves formed therein, each track groove has roller guide surfaces arranged circumferentially opposed to each other;
   a tripod member having three radially protruding trunnions;
   a roller fitted in a corresponding track groove; and
   a ring fitted on each trunnion for rotatably supporting said roller so that the roller is movable axially of the outer joint member along a corresponding roller guide surface,
   wherein an outer circumferential surface of said each trunnion has a straight shape, as viewed in a longitudinal section, and has, as viewed in a cross section, a shape which allows contact with an inner circumferential surface of said corresponding ring in a direction orthogonal to an axis of the outer joint member and allows creation of a gap between the outer circumferential surface of said each trunnion and the inner circumferential surface of said corresponding ring in an axial direction of the outer joint member, wherein said inner circumferential surface of said corresponding ring is shaped such that a diameter of said corresponding ring increases in a direction from an axial central portion of said corresponding ring to an end-face side thereof, and wherein a generatrix of the inner circumferential surface of each ring forms a part of an ellipse having a major axis extending in a direction orthogonal to the axis of said each ring.

2. The constant velocity universal joint according to claim 1, wherein, a contact surface pressure between said each trunnion and said corresponding ring is set to a range of 270 to 440 kgf/mm$^2$ when the outer joint member is put under basic torque.

3. The constant velocity universal joint according to claim 2, wherein an allowable relative inclination angle between said each trunnion and said corresponding ring in a loading direction is set to a range of 2 to 5°.

4. The constant velocity universal joint according to claim 1, wherein a maximum contact surface pressure between said each trunnion and said corresponding ring is set at 440 kgf/mm$^2$ when the outer joint member is put under basic torque, and a relatively small radius of curvature of the inner circumferential surface of said corresponding ring.

5. The constant velocity universal joint according to claim 4, wherein an allowable relative inclination angle between said each trunnion and said corresponding ring in a loading direction is set to a range of 2 to 5°.

6. The constant velocity universal joint according to claim 1, wherein an allowable relative inclination angle between said each trunnion and said corresponding ring in a loading direction is set to a range of 2 to 5°.

7. A constant velocity universal joint comprising:

an outer joint member having three track grooves formed therein, each track groove has roller guide surfaces arranged circumferentially opposed to each other;

a tripod member having three radially protruding trunnions;

a roller fitted in a corresponding track groove; and a ring fitted on each trunnion for rotatably supporting said roller so that the roller is movable axially of the outer joint member along a corresponding roller guide surface, wherein an outer circumferential surface of said each trunnion has a straight shape, as viewed in a longitudinal section, and has, as viewed in a cross section, a shape which allows contact with an inner circumferential surface of said corresponding ring in a direction orthogonal to an axis of the outer joint member and allows creation of a gap between the outer circumferential surface of said each trunnion and the inner circumferential surface of said corresponding ring in an axial direction of the outer joint member, wherein said inner circumferential surface of said corresponding ring is shaped such that a diameter of said corresponding ring increases in a direction from an axial central portion of said corresponding ring to an end-face side thereof, and wherein the generatrix of the inner circumferential surface of said corresponding ring is composed of a central convex circular arc and a tangential line extending from an end portion of said convex circular arc to an end face of said corresponding ring.

8. The constant velocity universal joint according to claim 7, wherein, a contact surface pressure between said each trunnion and said corresponding ring is set to a range of 270 to 440 kgf/mm$^2$ when the outer joint member is put under basic torque.

9. The constant velocity universal joint according to claim 8, wherein an allowable relative inclination angle between said each trunnion and said corresponding ring in a loading direction is set to a range of 2 to 5°.

10. The constant velocity universal joint according to claim 7, wherein a maximum contact surface pressure between said each trunnion and said corresponding ring is set at 440 kgf/mm$^2$ when the outer joint member is put under basic torque, and a relatively small radius of curvature of the inner circumferential surface of said corresponding ring.

11. The constant velocity universal joint according to claim 10, wherein an allowable relative inclination angle between said each trunnion and said corresponding ring in a loading direction is set to a range of 2 to 5°.

12. The constant velocity universal joint according to claim 7, wherein an allowable relative inclination angle between said each trunnion and said corresponding ring in a loading direction is set to a range of 2 to 5°.

* * * * *